US012502232B2

(12) United States Patent
Sundarapandian et al.

(10) Patent No.: US 12,502,232 B2
(45) Date of Patent: Dec. 23, 2025

(54) METHOD, DEVICE AND SYSTEM FOR PROVIDING A VIRTUAL MEDICAL PROCEDURE DRILL

(71) Applicant: Siemens Healthcare GmbH, Erlangen (DE)

(72) Inventors: Manivannan Sundarapandian, Bangalore (IN); Tobias Lenich, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 818 days.

(21) Appl. No.: 17/383,429

(22) Filed: Jul. 22, 2021

(65) Prior Publication Data

US 2022/0022973 A1    Jan. 27, 2022

(30) Foreign Application Priority Data

Jul. 23, 2020    (EP) .................................... 20187419

(51) Int. Cl.
*A61B 34/00*    (2016.01)
*A61B 5/0205*    (2006.01)
(Continued)

(52) U.S. Cl.
CPC ............ *A61B 34/25* (2016.02); *A61B 5/0205* (2013.01); *A61B 5/165* (2013.01); *A61B 34/10* (2016.02);
(Continued)

(58) Field of Classification Search
None
See application file for complete search history.

(56) References Cited

U.S. PATENT DOCUMENTS 7,955,270 B2    6/2011    Keal et al.
2004/0169620 A1    9/2004    Baram
(Continued)

FOREIGN PATENT DOCUMENTS

EP    3381353 A1    10/2018
GB    2545641 A    6/2017
WO    2018165473 A1    9/2018

OTHER PUBLICATIONS

European Search Report for European Application No. 20187419.5-1126 dated Dec. 21, 2021.
(Continued)

*Primary Examiner* — Yi Wang
(74) *Attorney, Agent, or Firm* — Lempia Summerfield Katz LLC

(57) ABSTRACT

A method includes receiving input data associated with a patient and predicting, using a trained machine learning model, a number of repetitions of a virtual drill to be undertaken by the patient based on the input data. The virtual drill is a virtual representation of a medical procedure to be undergone by the patient. At least one instance of the virtual drill is executed for the patient based on the predicted number of repetitions of the virtual drill, and one or more parameters associated with the patient are captured during the execution of the virtual drill. The one or more parameters depict an emotional response. The prediction of the number of repetitions of the virtual drill to be executed for the patient is modified based on the captured one or more parameters associated with the patient and/or the number of repetitions of the virtual drill executed for the patient.

19 Claims, 10 Drawing Sheets

(51) Int. Cl.
  *A61B 5/16* (2006.01)
  *A61B 34/10* (2016.01)
  *G06N 20/00* (2019.01)
  *G16H 20/40* (2018.01)

(52) U.S. Cl.
  CPC ............. *G06N 20/00* (2019.01); *G16H 20/40* (2018.01); *A61B 2034/101* (2016.02); *A61B 2034/107* (2016.02); *A61B 2034/256* (2016.02)

(56) References Cited

U.S. PATENT DOCUMENTS

| | | | |
|---|---|---|---|
| 2012/0157841 A1 | 6/2012 | Glaenzer et al. | |
| 2012/0258437 A1* | 10/2012 | Sadeh-Koniecpol | G06F 21/56 434/362 |
| 2018/0296793 A1* | 10/2018 | Porges | A61B 5/12 |
| 2019/0009956 A1 | 1/2019 | Fitzpatrick | |
| 2019/0030394 A1* | 1/2019 | Orr | G16H 20/30 |
| 2021/0008413 A1* | 1/2021 | Asikainen | G06F 3/0304 |
| 2021/0383921 A1* | 12/2021 | Isobe | G16H 20/00 |

OTHER PUBLICATIONS

Kruse, Jan, et al. "Virtual Reality MRI Experience for Children." Joint International Conference on Serious Games. Springer, Cham, 2016. pp. 1-5.

KiHoon Sung et al., "Cardiac dose reduction with breathing adapted radiotherapy using self respiration monitoring system for left-sided breast cancer," Radiat Oncol J. 2014; vol. 32(2), pp. 84-94.

Florian Krause et al., "Active head motion reduction in magnetic resonance imaging using tactile feedback," Hum Brain Mapp. 2019; vol. 40, pp. 4026-4037.

David T. To et al., "Impact of incorporating visual biofeedback in 4D MRI," Journal of Applied Clinical Medical Physics, vol. 17, No. 3, 2016, pp. 128-137.

\* cited by examiner

METHOD, DEVICE AND SYSTEM FOR PROVIDING A VIRTUAL MEDICAL PROCEDURE DRILL

PRIORITY

This application claims the benefit of European Patent Application No. EP 20187419.5, filed Jul. 23, 2020, which is hereby incorporated by reference in its entirety.

FIELD OF TECHNOLOGY

The present embodiments relates to a method, device, and system for managing patient health. More specifically, the present embodiments relate to providing a virtual medical procedure drill to a patient.

BACKGROUND

Emotional responses may be triggered through various stimuli such as environment, interactions or communication with one or more persons, circumstances, etc. Such emotional responses may be of two kinds, positive and negative. Negative emotional responses such as stress, fear, anxiety, etc. are a cause of several actions most of which are harmful to the human body. Negative emotional responses may be commonly observed in patients scheduled to undergo a complex medical procedure or medical procedures that may involve complex medical equipment or systems. Such negative emotional responses may affect the efficiency and timeliness of medical care provided to an individual. For example, if an individual is stressed or anxious prior to a surgical process, the bodily functions associated with the individual may also be affected. Stress and anxiety may lead to increase in the heart rate and endocrine functions of the individual, which may require frequent rescheduling of the surgical process. Therefore, this results in a delay in affording necessary medical attention to the individual. Additionally, if the patient has to undergo a medical imaging procedure such as an magnetic resonance imaging scan, etc., the patient is required to be positioned without any motion so as to avoid any motion artifacts in the medical image. However, if the patient is anxious or stressed, it may be difficult for the patient to maintain a stable position inside the imaging unit. Additionally, if the patient has moved, it may be difficult for the patient to understand and determine the target position in which the patient was initially imaged.

Currently, there is no way to effectively detect and regulate emotional cues associated with a patient that may occur before undergoing a medical procedure. Therefore, there is no way of taking precautionary measures that may reduce/eliminate the anxiety faced by the patient before the patient undergoes the medical procedure.

SUMMARY AND DESCRIPTION

The scope of the present invention is defined solely by the appended claims and is not affected to any degree by the statements within this summary.

There is a need for a method, device, and system that effectively regulates an emotional response associated with the patient.

The present embodiments may obviate one or more of the drawbacks or limitations in the related art. For example, a method, a device, and a system for providing to a patient a virtual medical procedure drill that is effective and may be easily executed are provided.

In the following, the present embodiments are described with respect to a system as well as with respect to a method. Features, advantages, or alternative embodiments herein may be assigned to objects and vice versa. In other words, the system may be improved with features described in the context of the method. In this case, the functional features of the method are embodied by objective units of the system.

The present embodiments describe a method of providing a virtual medical procedure drill to a patient. An emotional response may be displayed by the patient before undergoing a medical procedure. Such emotional response may include stress, anxiety, fear, etc., which may cause one or more physiological changes in the patient. Therefore, providing a virtual drill to the patient may enable regulating the emotional response, including reducing the intensity associated with the emotional response or eliminating the emotional response. The method includes receiving input data associated with the patient. The input data may include information associated with the patient. For example, the input data may include age of the patient, gender of the patient, medical procedure required to be undergone by the patient, one or more instruments associated with the medical procedure to be undergone by the patient, and medical history data associated with the patient. Additionally, the input data associated with the patient may also include one or more position details associated with the patient. The position details may be a target position that the patient may assume during the initiation of a virtual drill. For example, the target position of the patient may be similar to a position assumed by the patient when a medical imaging process is initiated.

The method further includes predicting, using a trained machine learning model, a number of repetitions of the virtual drill to be undertaken by the patient. The virtual drill may be a virtual representation of the medical procedure to be undergone by the patient. The prediction of the number of repetitions of the virtual drill to be undertaken by the patient may be determined based on the input data associated with the patient. For example, if the medical history associated with the patient suggests anxiety disorders, the number of repetitions of the virtual drill to be undertaken by the patient may be greater in comparison to another patient without a medical history of anxiety. For example, a patient within a certain age bracket may be prone to greater anxiety in comparison to other patients outside the age bracket. Therefore, the number of repetitions of the virtual drill to be undertaken by the patient may be predicted accordingly. In one embodiment, the input data associated with the patient provides information related to complexity of the medical procedure, patient demographic data, etc. Therefore, an execution of the virtual drill may be effectively planned. The prediction of the number of repetitions of the virtual drill to be undertaken by the patient may further be determined based on one or more parameters associated with the patient. The one or more parameters may include, but not be limited to, heart rate of the patient, blood pressure of the patient, body temperature of the patient, etc. In an embodiment, the one or more parameters may also include position details of the patient on a patient bed. The position details enable determination of any body movement performed by the patient that may digress from the target position of the patient.

The method further includes executing at least one instance of the virtual drill for the patient based on the predicted number of repetitions of the virtual drill. The virtual drill may be executed, for example, before the patient undergoes the medical procedure. In an embodiment, the virtual drill may be executed on a wearable output device to be used by the patient. For example, the wearable device may be a head mounted device capable of rendering a virtual representation of the medical procedure to be undergone by the patient. Additionally, the virtual drill may also depict a graphical representation of a deviation from the target angular position assumed by the patient during the initiation of the virtual drill based on a current or real-time position of the patient during the execution of the virtual drill. The virtual drill may be executed for the patient in a location remotely located from the location of the medical procedure. Therefore, the virtual drill may be undertaken by the patient in his/her residence.

The method further includes capturing one or more parameters associated with the patient during the execution of the virtual drill. The one or more parameters may depict the emotional response associated with the patient during the execution of the virtual drill. For example, one or more sensors may be coupled to the body of the patient and may be configured to capture the one or more parameters associated with the patient. The one or more parameters may include, but not be limited to, heart rate of the patient, blood pressure of the patient, body temperature of the patient, etc. In an embodiment, the one or more parameters may also include position details of the patient on a patient bed. The position details may include, for example, an angular position of one or more body parts associated with the patient, orientation of the patient, and/or pose of at least one body part associated with the patient. The position details enable determination of any body angular movement performed by the patient that may digress from the target position of the patient.

The method further includes modifying the prediction of the number of repetitions of the virtual drill to be executed for the patient based on the one or more parameters associated with the patient and/or the number of repetitions of the virtual drill executed for the patient. The one or more parameters associated with the patient may act as a guidance to determine if the patient is undergoing stress, anxiety, or fear while the virtual drill is being executed. Based on the captured one or more parameters, the number of repetitions of the virtual drill may be modified. For example, if the one or more parameters associated with the patient are not within pre-defined threshold(s), an increase in the number of repetitions of the execution of the virtual drill may be performed. Modification of the number of repetitions of the virtual drill enables effective regulation of the emotional response associated with the patient. Additionally, if the predicted number of repetitions have been executed for the patient already, the prediction of the number of repetitions of the virtual drill may be modified accordingly.

According to an embodiment, the method further includes configuring a virtual drill to be executed for the patient. Configuration of the virtual drill enables efficient identification of one or more aspects associated with the medical drill to be considered for regulation of the emotional response associated with the patient. According to a further embodiment, configuring the virtual drill includes identifying information associated with the medical procedure to be undergone by the patient. The information includes, for example, information associated with entities proposed to be involved in the medical procedure. The entities may be, for example, medical personnel proposed to be involved in the medical procedure. The medical personnel may include, but not be limited to, doctors, radiologists, nurses, medical support staff, etc. The information associated with the medical procedure may also include territorial location of the medical procedure. The territorial location may include, for example, a medical facility such as a hospital, a clinic, a diagnostic center, etc. The territorial location may also include finer details of the location such as an emergency room where the medical procedure may be conducted, a radiological laboratory, intensive case units, one or more corridors in the medical facility connecting a plurality of rooms in the medical facility, etc. Further, the information associated with the medical procedure may include one or more resources proposed to be used during/in the medical procedure. The resources may include medical equipment (e.g., medical devices such as radiological devices, surgical equipment, surgical table(s), and any other equipment that may be used in performing the medical procedure). The method further includes generating a virtual rendering of the information for the virtual drill. Virtual rendering may include generating a virtual representation of the information associated with the medical procedure. The virtual representation may also be, for example, a virtual reality based rendering that may create an immersive effect for the patient during the virtual drill. Alternatively, the virtual representation may also include augmented reality based or mixed reality based rendering.

In an embodiment, the virtual representation may also include a real-time visual biofeedback for correcting a motion associated with the patient. The motion may include any body movement performed by the patient during the duration of the medical procedure. The biofeedback may be based on a comparison between a real-time angular position assumed by the patient and the target position assumed by the patient in the beginning of the virtual drill. If a deviation is identified between the real-time position and the target position of the patient, the visual biofeedback may be provided to the patient. The real-time visual biofeedback enables the patient to reposition his/her body or a body part to the target position that may have been assumed by the patient during the initiation of the medical procedure. In an embodiment, the visual biofeedback may be in the form of visual cues provided to the patient during the virtual drill. The visual cues may include a virtual indication of the target position to be assumed by the patient and the real-time position of the patient. The visual cues may further include one or more directional indicators that may enable the patient to move the body part from the real-time position to the target position, if a deviation between the real-time position and the target position is identified. Additionally, the virtual drill may require the patient to assume multiple target positions. The real-time visual biofeedback enables the patient to learn and assume the multiple positions specified in the virtual drill efficiently.

In another embodiment, the patient may undertake the virtual drill in a position similar to that of a position in which the patient may assume during the actual medical procedure (e.g., the target position). Therefore, assuming the target position during the virtual drill enables the patient to get accustomed to the position to be assumed during the actual medical procedure. The one or more sensors associated with the head mounted device may be configured to capture positional information associated with a surface on which the patient assumes the target position. The one or more sensors may be used for determination of any angular deviation, such as pitch, roll and yaw, of the body part associated with the patient that may occur in real-time, in comparison to the target position to be assumed by the patient.

In one embodiment, configuring the virtual drill enables adapting the one or more information associated with the medical procedure effectively into a virtual environment.

Therefore, the virtual drill enables the patient to virtually experience the medical procedure and additional acts associated with the medical procedure, before undergoing the medical procedure in real-time. Therefore, virtual drill enables the patient to acclimatize to the medical procedure without stress, fear, or anxiety.

According to another embodiment, configuring the virtual drill further includes generating a virtual representation of the one or more entities proposed to be involved in the medical procedure. The virtual representation may include, for example, a 3-dimensional representation of one or more medical personnel proposed to be involved in the medical procedure. For example, the virtual representation may also include photographic representation of the medical personnel. The method further includes extracting, from a database, a virtual model of the territorial space where the patient may undergo the medical procedure. The virtual model may be a 3-dimensional model of the medical facility where the patient may undergo the medical procedure. The virtual model of the territorial space may include information associated with a plurality of rooms in the medical facility including but not limited to a plurality of corridors connecting the plurality of rooms in the medical facility. The virtual model of the territorial space may enable the patient to get familiar with the medical facility and the plurality of rooms that may be involved in the medical procedure. The method further includes obtaining one or more images of the one or more resources to be utilized in the medical procedure. The one or more images of the resources may be added to the virtual rendering to generate a holistic experience of the medical procedure. The resources may include complex medical equipment or simple medical devices that may be utilized in the medical procedure. The method further includes identifying one or more procedural workflows associated with the medical procedure to be undergone by the patient. The procedural workflow provides for step-by-step detail of the medical procedure. The procedural workflow enables the patient to identify what steps are to be expected during the medical procedure.

According to an embodiment, the method further includes terminating the virtual drill to be undertaken by the patient if the prediction of the number of repetitions for the virtual drill is null. If the patient has already undergone the virtual drill according to the number of repetitions of the virtual drill predicted by the trained machine learning model, further instances of execution of the virtual drill may be terminated.

According to another embodiment of the method, the virtual model of the territorial location further includes one or more navigation details associated with the territorial location. The navigation details may include details on how the patient may be traversing from one location to another within the medical facility for completion of a plurality of steps involved in the medical procedure. The navigation details may include, for example, one or more indicative arrows that may indicate one or more directions in which the patient may move/may be moved during the medical procedure. The navigation details may be adapted according to the procedural workflow of the medical procedure such that when the patient undergoes the virtual drill, the patient experiences how the actual medical procedure may occur in multiple locations within the medical facility.

According to an embodiment, the one or more parameters associated with the patient includes blood pressure data associated with the patient, heart rate associated with the patient, body temperature associated with the patient, and/or a rate of perspiration associated with the patient. While undergoing a negative emotional response such as stress, anxiety, or fear, the one or more parameters associated with the patient may deviate from a normal threshold. For example, the heart rate associated with the patient may increase when undergoing anxiety, fear, or stress. Similarly, the blood pressure of the patient may also increase due to fear or stress. Additionally, the body temperature of the patient may increase or decrease if the patient is undergoing a negative emotional response. In one embodiment, capturing the one or more parameters associated with the patient enables effective identification of the negative emotional response associated with the patient.

According to yet another embodiment, predicting the number of repetitions of the virtual drill to be performed by the patient includes obtaining the input data associated with the patient. The method also includes extracting one or more historical records associated with the virtual drill from a database based on the input data associated with the patient. The one or more historical records may be associated with a plurality of other patients who may have undergone the virtual drill for the same medical procedure. Such other patients may also have similar associated input data, such as age, gender, medical history, etc. The historical records may include information associated with number of repetitions of the virtual drill underwent by the other patients. The method further includes predicting the number of repetitions of the virtual drill to be performed by the patient based on the one or more historical records associated with the virtual drill. The number of repetitions of the virtual drill to be undergone by the patient may be determined based on such historical records associated with the virtual drill. In one embodiment, an appropriate number of repetitions of the virtual drill enables the patient to overcome any fear, anxiety, and/or stress associated with the medical procedure. Therefore, the patient may feel confident before undergoing and while undergoing the medical procedure.

According to an embodiment, executing the at least one instance of the virtual drill includes displaying the virtual rendering of the information associated with the medical procedure to be undergone by the patient. Additionally, the virtual drill may also depict a graphical representation of a deviation between the target position assumed by the patient during the initiation of the medical procedure and a current or real-time position of the patient during the execution of the virtual drill. The real-time position of the patient may be detected using one or more sensors. The sensors may be, for example, a camera associated with the head mounted device, and/or a gyroscope associable with the patient. The virtual rendering may be displayed on an output device. The output device may be, for example, a head mounted device configured to project a virtual reality based display of the virtual drill. Alternatively, the display unit may be a handheld device or a computing device. In one embodiment, the virtual drill enables the patient to overcome any negative emotion associated with the medical procedure.

According to yet another embodiment, modifying the prediction of the number of repetitions of the virtual drill includes determining a value associated with the one or more parameters. The method further includes determining if the one or more parameter values associated with the patient is above a pre-defined threshold. The one or more parameters may deviate from the pre-defined threshold while experiencing a negative emotional response. Therefore, a check is performed to determine if the one or more parameters associated with the patient are above the pre-defined threshold. If the one or more parameter values are above the pre-defined threshold, the number of repetitions of the execution of the virtual drill is increased. In one embodiment, the increased number of repetitions of the virtual drill may enable the patient to get familiar with the medical procedure. This may regulate the emotional response associated with the patient. If the one or more parameter values are within the pre-defined threshold, the number of repetitions of the virtual drill may be maintained. In an alternate embodiment, the number of repetitions of the virtual drill may be reduced if the one or more parameter values are below the pre-defined threshold. In yet another embodiment, the patient may be given a choice to modify the number of repetitions of the virtual drill based on the interest of the patient. In one embodiment, the virtual drill enables regulating the emotional response associated with the patient that may be generated due to an anticipation of the medical procedure.

The present embodiments relate, in one aspect, to a method of training at least one machine learning model to regulate an emotional response associated with a patient. The method includes receiving one or more input data associated with one or more patients. The one or more patients may have undergone at least one instance of the virtual drill. The input data associated with the one or more patients include, for example, age, gender, medical history, data associated with medical procedure(s) undergone by the one or more patients, etc. The method further includes input data associated with the patient. At least one machine learning model is received. In an embodiment, the machine learning model may be configured to analyze the input data associated with the patient and determine a number of repetitions of the virtual drill to be executed by the patient. The number of repetitions of the virtual drill to be executed may be determined by the machine learning model based on the input data associated with the one or more patients. The method further includes executing at least one instance of the virtual drill for the patient based on the determined number of repetitions of the virtual drill. In an embodiment, the virtual drill may be executed in a display unit associated with the patient. During the execution of the virtual drill, one or more parameters associated with the patient may be captured. The one or more parameters may be indicative of the emotional response associated with the patient with regard to the medical procedure to be undergone by the patient. The method further includes adjusting the machine learning model based on the one or more parameters associated with the patient. The machine learning model may be adjusted such that the number of repetitions of execution of the virtual drill for the patient may be modified based on the one or more captured parameters associated with the patient. In one embodiment, training of the machine learning model enables improvement in the accuracy of predicting the number of repetitions of the virtual drill to be executed for the patient. Further, training of the machine learning model makes the machine learning model more robust and effective.

The present embodiments relate, in one aspect, to a device for providing a virtual medical procedure drill to the patient. The device includes one or more processing units and a memory communicatively coupled to the one or more processing units. The memory includes a virtual drill module that may be configured to perform the method acts of providing a virtual medical procedure drill to the patient.

According to an embodiment, the virtual drill module is configured to provide a virtual medical procedure drill to a patient. An emotional response may be displayed by the patient before undergoing a medical procedure. Such emotional response may include stress, anxiety, fear, etc., which may cause one or more physiological changes in the patient. Therefore, providing a virtual medical procedure drill to the patient enables regulating the emotional response, including reducing the intensity associated with the emotional response or eliminating the emotional response. The virtual drill module is configured to receive input data associated with the patient. The input data may include information associated with the patient. For example, the input data may include age of the patient, gender of the patient, medical procedure required to be undergone by the patient, one or more instruments associated with the medical procedure to be undergone by the patient, and one or more medical history data associated with the patient. Additionally, the input data associated with the patient may also include one or more position details associated with the patient. The position details may be a target position that the patient may assume during the initiation of a virtual drill. For example, the target position of the patient may be similar to a position assumed by the patient when a medical imaging process is initiated. The virtual drill module is further configured to predict, using a trained machine learning model, number of repetitions of a virtual drill to be undertaken by the patient. The virtual drill may be a virtual representation of the medical procedure to be undergone by the patient. The prediction of the number of repetitions of the virtual drill to be undertaken by the patient may be determined based on the one or more input data associated with the patient. For example, if the medical history associated with the patient suggests anxiety disorders, the number of repetitions of the virtual drill to be undertaken by the patient may be greater in comparison to another patient without a medical history of anxiety. For example, a patient within a certain age bracket may be prone to greater anxiety in comparison to other patients outside the age bracket. Therefore, the number of repetitions of the virtual drill to be undertaken by the patient may be predicted accordingly. In one embodiment, the input data associated with the patient provides information related to complexity of the medical procedure, patient demographic data, etc. Therefore, an execution of the virtual drill may be effectively planned. The prediction of the number of repetitions of the virtual drill to be undertaken by the patient may further be determined based on one or more parameters associated with the patient. The one or more parameters may include, but not be limited to, heart rate of the patient, blood pressure of the patient, body temperature of the patient, etc. In an embodiment, the one or more parameters may also include position details of the patient on a patient bed. The position details enable determination of any body movement performed by the patient that may digress from the target position of the patient.

The virtual drill module is further configured to execute at least one instance of the virtual drill for the patient based on the predicted number of repetitions of the virtual drill. The virtual drill may be executed, for example, before the patient undergoes the medical procedure. In an embodiment, the virtual drill may be executed on a wearable output device to be used by the patient. For example, the wearable device may be a head mounted device capable of rendering a virtual representation of the medical procedure to be undergone by the patient. Additionally, the virtual drill may also depict a graphical representation of a deviation from the target position assumed by the patient during the initiation of the virtual drill based on a current or real-time position of the patient during the execution of the virtual drill. The virtual drill may be executed for the patient in a location remotely located from the location of the medical procedure. Therefore, the virtual drill may be undertaken by the patient in his/her residence.

The virtual drill module is configured to capture one or more parameters associated with the patient during the execution of the virtual drill. The one or more parameters may depict the emotional response associated with the patient during the execution of the virtual drill. For example, one or more sensors may be connected to the body of the patient, which may be configured to capture the one or more parameters associated with the patient. The one or more parameters may include, but not be limited to, heart rate of the patient, blood pressure of the patient, body temperature of the patient, etc. In an embodiment, the one or more parameters may also include position details of the patient on a patient bed. The position details enable determination of any body movement performed by the patient that may digress from the target position of the patient. The virtual drill module is further configured to modify the prediction of the number of repetitions of the virtual drill to be executed for the patient based on the one or more parameters associated with the patient and/or the number of repetitions of the virtual drill executed for the patient. The one or more parameters associated with the patient may act as a guidance to determine if the patient is undergoing stress, anxiety, or fear while the virtual drill is being executed. Based on the captured one or more parameters, the number of repetitions of the virtual drill may be modified. For example, if the one or more parameters associated with the patient are not within pre-defined threshold(s), an increase in the number of repetitions of the execution of the virtual drill may be performed. Modification of the number of repetitions of the virtual drill enables effective regulation of the emotional response associated with the patient. Additionally, if the predicted number of repetitions have been executed for the patient already, the prediction of the number of repetitions of the virtual drill may be modified accordingly.

According to an embodiment, the virtual drill module further configures a virtual drill to be executed for the patient. Configuration of the virtual drill enables efficient identification of one or more aspects associated with the medical drill to be considered for regulation of the emotional response associated with the patient. According a further embodiment, configuring the virtual drill includes identifying information associated with the medical procedure to be undergone by the patient. The information includes, for example, information associated with entities proposed to be involved in the medical procedure. The entities may be, for example, medical personnel proposed to be involved in the medical procedure. The medical personnel may include, but not be limited to, doctors, radiologists, nurses, medical support staff, etc. The information associated with the medical procedure may also include territorial location of the medical procedure. The territorial location may include, for example, a medical facility such as a hospital, a clinic, a diagnostic center, etc. The territorial location may also include finer details of the location such as an emergency room where the medical procedure may be conducted, a radiological laboratory, intensive case units, one or more corridors in the medical facility connecting a plurality of rooms in the medical facility, etc. Further, the information associated with the medical procedure may include one or more resources proposed to be used during/in the medical procedure. The resources may include medical equipment (e.g., medical devices such as radiological devices, surgical equipment, surgical table(s), and any other equipment that may be used in performing the medical procedure). The virtual drill module is further configured to generate a virtual rendering of the information for the virtual drill. Virtual rendering may include generating a virtual representation of the information associated with the medical procedure. The virtual representation may also be, for example, a virtual reality based rendering that may create an immersive effect for the patient during the virtual drill. In an embodiment, the virtual representation may also include a real-time visual biofeedback for correcting a motion associated with the patient. The motion may include any body movement performed by the patient during the duration of the medical procedure. The real-time visual biofeedback enables the patient to reposition his/her body or a body part to a target position that may have been observed by the patient during the initiation of the medical procedure.

In one embodiment, configuring the virtual drill enables adapting the information associated with the medical procedure effectively into a virtual environment. Therefore, the virtual drill enables the patient to virtually experience the medical procedure and additional steps associated with the medical procedure, before undergoing the medical procedure in real-time. Therefore, virtual drill enables the patient to acclimatize to the medical procedure without stress, fear, or anxiety.

According to another embodiment, configuring the virtual drill further includes generating a virtual representation of the one or more entities proposed to be involved in the medical procedure. The virtual representation may include, for example, a 3-dimensional representation of one or more medical personnel proposed to be involved in the medical procedure. For example, the virtual representation may also include photographic representation of the medical personnel. The virtual drill module is further configured to extract, from a database, a virtual model of the territorial space where the patient may undergo the medical procedure. The virtual model may be a 3-dimensional model of the medical facility where the patient may undergo the medical procedure. The virtual model of the territorial space may include information associated with a plurality of rooms in the medical facility including but not limited to a plurality of corridors connecting the plurality of rooms in the medical facility. The virtual model of the territorial space may enable the patient to get familiar with the medical facility and the plurality of rooms that may be involved in the medical procedure. The virtual drill module is further configured to obtain one or more images of the one or more resources to be utilized in the medical procedure. The one or more images of the resources may be added to the virtual rendering to generate a holistic experience of the medical procedure. The resources may include complex medical equipment or simple medical devices that may be utilized in the medical procedure. The virtual drill module is further configured to identify one or more procedural workflows associated with the medical procedure to be undergone by the patient. The procedural workflow provides for step-by-step detail of the medical procedure. The procedural workflow enables the patient to identify what steps are to be expected during the medical procedure.

According to an embodiment, the virtual drill module is further configured to terminate the virtual drill to be undertaken by the patient if the prediction of the number of repetitions for the virtual drill is null. If the patient has already undergone the virtual drill according to the number of repetitions of the virtual drill predicted by the trained machine learning model, further instances of execution of the virtual drill may be terminated.

According to another embodiment of the method, the virtual model of the territorial location further includes one or more navigation details associated with the territorial location. The navigation details may include details on how the patient may be traversing from one location to another within the medical facility for completion of a plurality of steps involved in the medical procedure. The navigation details may include, for example, one or more indicative arrows that may indicate one or more directions in which the patient may move/may be moved during the medical procedure. The navigation details may be adapted according to the procedural workflow of the medical procedure such that when the patient undergoes the virtual drill, the patient experiences how the actual medical procedure may occur in multiple locations within the medical facility.

According to an embodiment, the one or more parameters associated with the patient include blood pressure data associated with the patient, heart rate associated with the patient, body temperature associated with the patient, and/or a rate of perspiration associated with the patient. While undergoing a negative emotional response such as stress, anxiety, or fear, the one or more parameters associated with the patient may deviate from a normal threshold. For example, the heart rate associated with the patient may increase when undergoing anxiety, fear, or stress. Similarly, the blood pressure of the patient may also increase due to fear or stress. Additionally, the body temperature of the patient may increase or decrease if the patient is undergoing a negative emotional response. In one embodiment, capturing the one or more parameters associated with the patient enables effective identification of the negative emotional response associated with the patient.

According to yet another embodiment, predicting the number of repetitions of the virtual drill to be performed by the patient includes obtaining the one or more input data associated with the patient. The virtual drill module is also configured to extract one or more historical records associated with the virtual drill from a database based on the input data associated with the patient. The one or more historical records may be associated with a plurality of other patients who may have undergone the virtual drill for the same medical procedure. Such other patients may also have similar associated input data, such as age, gender, medical history, etc. The historical records may include information associated with number of repetitions of the virtual drill underwent by the other patients. The virtual drill module is further configured to predict the number of repetitions of the virtual drill to be performed by the patient based on the one or more historical records associated with the virtual drill. The number of repetitions of the virtual drill to be undergone by the patient may be determined based on such historical records associated with the virtual drill. In one embodiment, an appropriate number of repetitions of the virtual drill enables the patient to overcome any fear, anxiety, and/or stress associated with the medical procedure. Therefore, the patient may feel confident before undergoing and while undergoing the medical procedure.

According to an embodiment, executing the at least one instance of the virtual drill includes displaying the virtual rendering of the one or more information associated with the medical procedure to be undergone by the patient. Additionally, the virtual drill may also depict a graphical representation of a deviation between the target position assumed by the patient during the initiation of the medical procedure and a current or real-time position of the patient during the execution of the virtual drill. The virtual rendering may be displayed on an output device. The output device may be, for example, a head mounted device configured to project a virtual reality based display of the virtual drill. Alternatively, the display unit may be a handheld device or a computing device. In one embodiment, the virtual drill enables the patient to overcome any negative emotion associated with the medical procedure.

According to yet another embodiment, in modifying the number of repetitions of the virtual drill, the virtual drill module is configured to determine a value associated with the one or more parameters. The virtual drill module is further configured to determine if the one or more parameter values associated with the patient is above a pre-defined threshold. The one or more parameters may deviate from the pre-defined threshold while experiencing a negative emotional response. Therefore, a check is performed to determine if the one or more parameters associated with the patient are above the pre-defined threshold. If the one or more parameter values are above the pre-defined threshold, the number of repetitions of the execution of the virtual drill is increased. In one embodiment, the increased number of repetitions of the virtual drill may enable the patient to get familiar with the medical procedure. This may regulate the emotional response associated with the patient. If the one or more parameter values are below the pre-defined threshold, the number of repetitions of the virtual drill may be maintained. In an alternate embodiment, the number of repetitions of the virtual drill may be reduced if the one or more parameter values are below the pre-defined threshold. In yet another embodiment, the patient may be given a choice to modify the number of repetitions of the virtual drill based on the interest of the patient. In one embodiment, the virtual drill enables regulating the emotional response associated with the patient that may be generated due to an anticipation of the medical procedure.

The present embodiments also relate to a system for providing a virtual medical procedure drill to a patient. The system includes one or more servers and one or more sensors communicatively coupled to the one or more servers. The one or more sensors may be configured to capture one or more parameters associated with the patient. The system further includes one or more user devices communicatively coupled to the one or more servers, where the one or more user devices are configured to execute at least one instance of a virtual drill. The one or more servers include computer readable instructions that, when executed by one or more servers, cause the one or more servers to perform method acts described above and below using at least one trained machine learning model.

The present embodiments relate, in one aspect, to a computer program product including a computer program. The computer program is loadable into a storage unit of a system. The computer program includes program code sections to make the system execute the method according to an aspect of the present embodiments when the computer program is executed in the system.

The present embodiments relate, in one aspect, to a computer-readable medium (e.g., non-transitory computer-readable storage medium), on which program code sections of a computer program are saved. The program code sections are loadable into and/or executable in a system to make the system execute the method according to an aspect of the present embodiments when the program code sections are executed in the system.

The realization of the present embodiments by a computer program product and/or a computer-readable medium has the advantage that already existing management systems may be easily adopted by software updates in order to work as proposed by the present embodiments.

The computer program product may be, for example, a computer program or include another element apart from the computer program. This other element may be hardware (e.g., a memory device, on which the computer program is stored, a hardware key for using the computer program, and the like) and/or software (e.g., a documentation or a software key for using the computer program).

DETAILED DESCRIPTION

Figure 1:
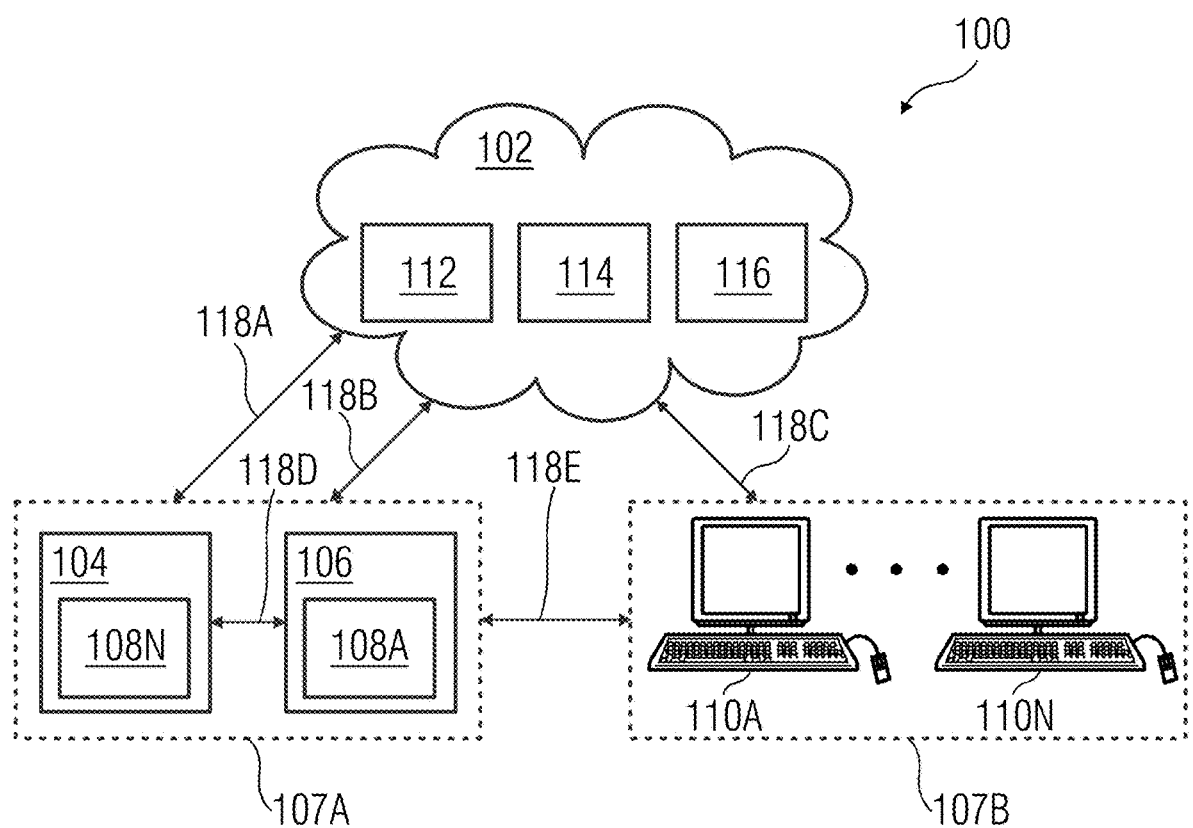
FIG. 1 is a schematic representation of a client-server architecture for regulating an emotional response associated with a patient, according to an embodiment.

Hereinafter, embodiments for carrying out the present embodiments are described in detail. The various embodiments are described with reference to the drawings, where like reference numerals are used to refer to like elements throughout. In the following description, for purpose of explanation, numerous specific details are set forth in order to provide a thorough understanding of one or more embodiments. Such embodiments may be practiced without these specific details.

FIG. 1 provides an illustration of a block diagram of a client-server architecture 100 that is a geometric modeling of components representing different parts of real-world objects, according to an embodiment. The client-server architecture 100 includes a server 102, one or more client devices 110A-N, and a user device 106. The user device 106 may be, for example, a wearable device such as a head mounted device. The user device 106 may be communicatively coupled to at least one sensor 104 configured to capture one or more parameters associated with a patient. Each of the user device 106, the sensor 104, and the client devices 110A-N is capable of communicating with the server 102 using respective communication interfaces 108A-N via communication links 118A-C via the Internet or a network. Also, the user device 106, the sensor 104, and the client devices 110A-N are capable of communicating with each other using respective communication interfaces 108A-N via communication links 118D to 116E. The communication links 118D to 118E may be wired or wireless links. The user device 106 may have an operating system and at least one software program for performing desired operations. Also, the user device 106 may run software applications for collecting, and pre-processing data and transmitting the data to the server 102. In an embodiment, the sensor 104 and the user device 106 may be in a different location 107A in comparison to a location 107B of the client devices 110A-N. For example, the sensor 104 and the user device 106 may be present in a residence of the patient, and the client devices 110A-N may be located in a medical facility.

The server 102 may be a cloud infrastructure capable of providing services such as data storage services, data analytics services, data visualization services, etc. based on the data captured by the user device 106. The server 102 may be part of public cloud or a private cloud. The server 102 may enable data scientists/software vendors to provide software applications/firmware as a service, thereby eliminating a need for software maintenance, upgrading, and backup by the users. The software application may be a full application or a software patch.

The one or more client devices 110A-N, the user device 106, and the sensor 104 are connected to the server 102 via a network (e.g., local area network (LAN), wide area network (WAN), WiFi, etc.). As used herein, "cloud infrastructure" refers to a processing environment including configurable computing physical and logical resources (e.g., networks, servers, storage, applications, services, etc.) and data distributed over the network (e.g., the Internet). The cloud infrastructure provides on-demand network access to a shared pool of the configurable computing physical and logical resources. The server 102 may include a medical database 114 that includes sensor data obtained from the sensor 104. The medical database 114 may also include=input data associated with the patient and historical data associated with one or more other patients who have undergone a virtual drill. The server 102 may further include a virtual drill module 112 that is configured to providing a virtual medical procedure drill to the patient. The server 102 may include an interface 116 that receives data (e.g., sensor data from the sensor 104) and transfers the sensor data to the medical database 114. Additionally, the interface 116 may also communicate with the client devices 110A-N and the user device 106 via the network.

The client device 110A-N is used by an entity to access data associated with the patient through the user device 106 and the sensor 104. The data on the server 102 may be accessed by the entity via a graphical user interface of an end user web application.

Figure 2:
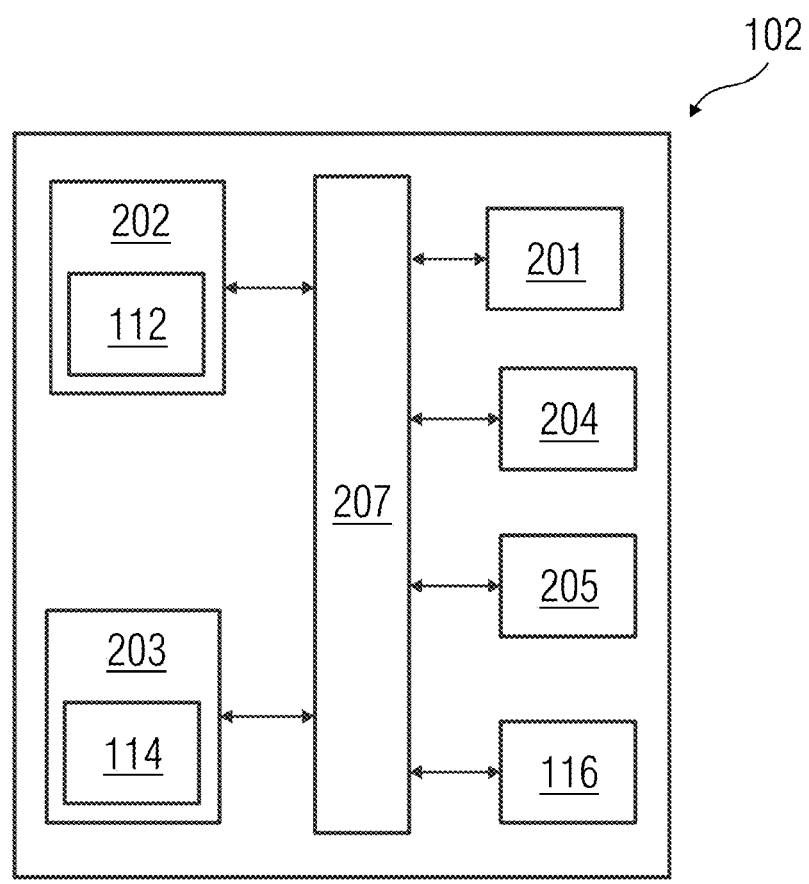
FIG. 2 is a block diagram of a device for providing a virtual medical procedure drill to a patient, according to an embodiment.

The server 102 is further illustrated in greater detail in FIG. 2. FIG. 2 is a block diagram of a device 102 in which an embodiment may be implemented, for example, as a device to provide a virtual medical procedure drill to a patient, configured to perform the processes as described therein. The device 102 is an exemplary implementation of the server in FIG. 1. In FIG. 2, the device 102 includes a processing unit 201, a memory 202, a storage unit 203, an input unit 204, an output unit 205, a network interface 116, and a standard interface or bus 207. The device 102 may be a computer (e.g., a personal computer), a workstation, a virtual machine running on host hardware, a microcontroller, or an integrated circuit. As an alternative, the device 102 may be a real or a virtual group of computers (e.g., the technical term for a real group of computers is "cluster", the technical term for a virtual group of computers is "cloud").

The processing unit 201, as used herein, may be any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 201 may also include embedded controllers, such as generic or programmable logic devices or arrays, application specific integrated circuits, single-chip computers, and the like. In general, a processing unit 201 may include hardware elements and software elements. The processing unit 201 may be configured for multithreading (e.g., the processing unit 201 may host different calculation processes at the same time, executing either in parallel or switching between active and passive calculation processes).

The memory 202 may be volatile memory and nonvolatile memory. The memory 202 may be coupled for communication with the processing unit 201. The processing unit 201 may execute instructions and/or code stored in the memory 202. A variety of computer-readable storage media may be stored in and accessed from the memory 202. The memory 202 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes a virtual drill module 112 stored in the form of machine-readable instructions on any of the above-mentioned storage media and may be in communication to and executed by processing unit 201. When executed by the processing unit 201, the virtual drill module 112 causes the processing unit 201 to provide a virtual medical procedure drill to the patient. Method acts executed by the processing unit 201 to achieve the abovementioned functionality are elaborated upon in detail in FIGS. 3-8.

The storage unit 203 may be a non-transitory storage medium that stores a medical database 114. The medical database 114 is a repository of information related to the patient. The input unit 204 may include input means such as keypad, touch-sensitive display, camera (e.g., a camera receiving gesture-based inputs), etc. capable of receiving input signal. The bus 207 acts as interconnect between the processing unit 201, the memory 202, the storage unit 203, the communication interface 116, the input unit 204, and the output unit 205.

Those of ordinary skilled in the art will appreciate that the hardware depicted in FIG. 2 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter may also be used in addition or in place of the hardware depicted. The depicted example is provided for the purpose of explanation only and is not meant to imply architectural limitations with respect to the present disclosure.

A device 102 in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by an entity through a pointing device or touch based gestures or hand gestures. The position of the cursor may be changed and/or an event such as clicking a mouse button may be generated to actuate a desired response.

One of various commercial operating systems, such as a version of Microsoft Windows™, a product of Microsoft Corporation located in Redmond, Washington may be employed if suitably modified. The operating system is modified or created in accordance with the present disclosure as described.

The present embodiments are not limited to a particular computer system platform, processing unit, operating system, or network. One or more aspects of the present embodiments may be distributed among one or more computer systems (e.g., servers configured to provide one or more services to one or more client computers, or to perform a complete task in a distributed system). For example, one or more aspects of the present embodiments may be performed on a client-server system that includes components distributed among one or more server systems that perform multiple functions according to various embodiments. These components include, for example, executable, intermediate, or interpreted code, which communicate over a network using a communication protocol. The present embodiments are not limited to be executable on any particular system or group of systems, and are not limited to any particular distributed architecture, network, or communication protocol.

Disclosed embodiments provide systems and methods for managing patient health. For example, the systems and methods may provide a virtual medical procedure drill to a patient.

Figure 3:
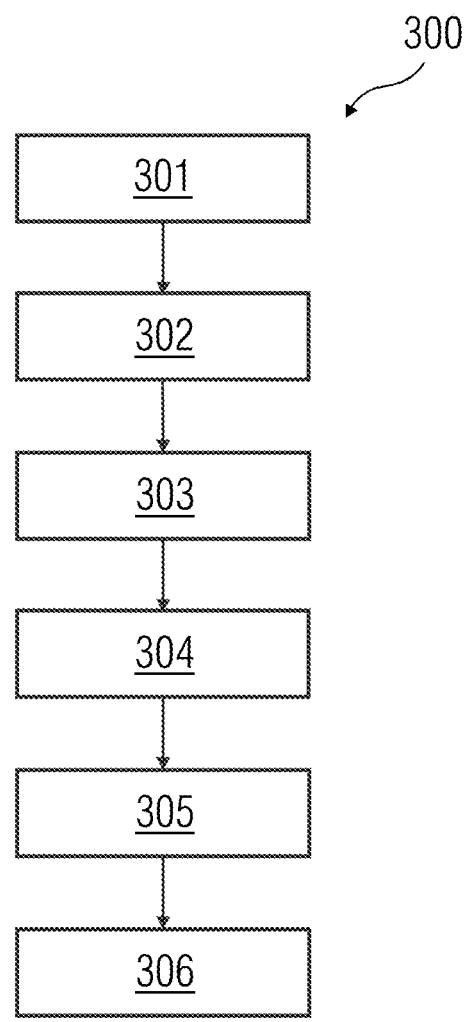
FIG. 3 illustrates a flowchart of a method of providing a virtual medical procedure drill to a patient, according to an embodiment.

FIG. 3 illustrates a flowchart of a method 300 of providing a virtual medical procedure drill to a patient, according to an embodiment. At act 301, input data associated with the patient is received from a source. The source may be, for example, a repository including a plurality of medical data associated with one or more patients, such as the medical database 114. In an embodiment, the one or more input data includes age of the patient, gender of the patient, medical procedure to be undergone by the patient, one or more instruments associated with the medical procedure to be undergone by the patient, and/or historical medical data associated with the patient. Additionally, the input data may also include position details associated with the patient. The position details may be details associated with a position assumed by the patient during the initiation of the medical procedure. Such position of the patient may be determined using one or more sensors configured to capture position information associated with the patient before the initiation of the virtual drill. The one or more sensors may be, for example, a camera associated with the head mounted device 106 or a gyroscope associated with the head mounted device 106. The one or more sensors are configured to detect and capture position details associated with the patient during a performance of the virtual drill. This position may be identified as a target position of the patient. The input data associated with the patient provides information for configuration of a virtual drill to be undergone by the patient. The virtual drill is a virtual depiction/representation of the medical procedure to be undergone by the patient in a near future. The virtual depiction may include a plurality of factors associated with the medical procedure such that the depiction of the medical procedure is almost life-like for the patient. The virtual depiction of the medical procedure enables the patient to get familiarized with the medical procedure and thereby avoid negative emotional responses such as stress, anxiety, fear, etc. Such negative emotional response may arise due to anticipation of the medical procedure by the patient. At act 302, the method 300 includes configuring the virtual drill to be undertaken by the patient. The method acts describing configuration of the virtual drill are described in further detail in FIG. 4. The method 300 further includes act 303 of predicting a number of repetitions of the virtual drill to be undertaken by the patient. The number of repetitions of the virtual drill to be undergone by the patient may be predicted by a trained machine learning model. The machine learning model uses the one or more input data associated with the patient to predict the number of repetitions of the virtual drill to be undertaken by the patient. For example, the intensity of the negative emotion felt by the patient may be dependent on the age of the patient, gender of the patient, one or more medical history associated with the patient such as anxiety disorders, etc. and/or a complexity of the medical procedure to be undergone by the patient.

At act 304, at least one instance of the virtual drill is executed for the patient based on the predicted number of repetitions of the virtual drill. Execution of the virtual drill may include, for example, displaying a virtual representation of the medical procedure to be undergone by the patient. In an embodiment, the virtual drill may be executed on a wearable device such as a head mounted device. The virtual representation may be a virtual reality based rendering of the medical procedure such that an immersive effect of the medical procedure may be generated for the patient. At act 305, one or more parameters associated with the patient is captured during the execution of the virtual drill. The one or more parameters may include, for example, heart rate of the patient, blood pressure of the patient, body temperature of the patient, rate of perspiration associated with the patient, etc. Additionally, the one or more parameters may include position details associated with the patient. For example, the position details include any movement of the body/body parts performed by the patient during the execution of the virtual drill. The movement may be, for example, an angular motion of the body part(s) associated with the patient. The one or more parameters associated with the patient may depict a presence of at least on negative emotional response that the patient undertaking the virtual drill may be experiencing. For example, the heart of the patient may rise above a pre-defined threshold if the patient is experiencing anxiety, fear, and/or stress.

At act 306, the prediction of the number of repetitions of the virtual drill to be undertaken by the patient is modified based on the captured one or more parameters associated with the patient. Modification of the prediction of the number of repetitions of the virtual drill enables regulating the emotional response associated with the patient that may stem from an anticipation of the medical procedure. For example, if the patient continues to experience negative emotional response, the number of repetitions of the virtual drill to be undertaken by the patient may be increased. Similarly, if the one or more parameters of the patient are within a pre-defined threshold, the number of repetitions of the virtual drill may be decreased. In one embodiment, the method enables effective monitoring and regulating of the one or more emotional responses associated with the patient. In an alternate embodiment, the method may further include terminating the virtual drill to be undertaken by the patient if the prediction of the number of repetitions for the virtual drill is null. If the patient has already undergone the virtual drill according to the number of repetitions of the virtual drill predicted by the trained machine learning model, further instances of execution of the virtual drill may be terminated.

Figure 4:
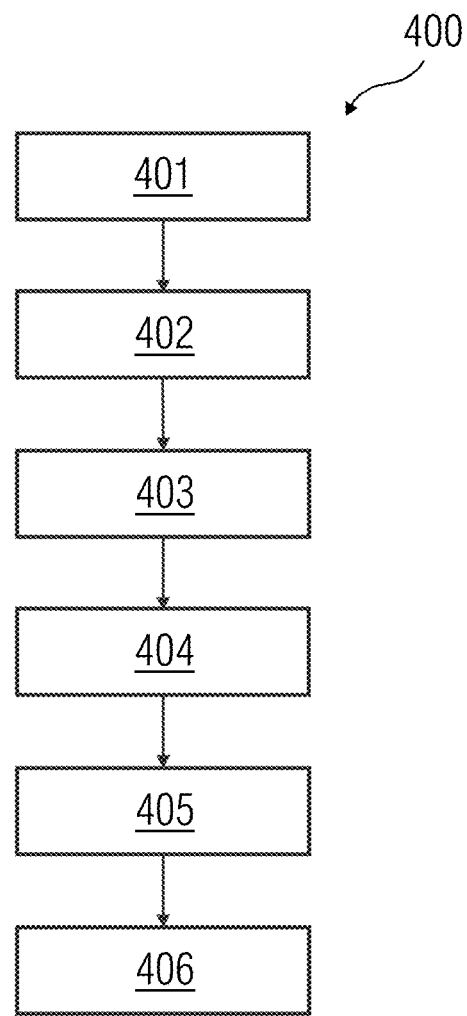
FIG. 4 illustrates a flowchart of a method of configuring a virtual drill, according to an embodiment.

FIG. 4 illustrates a flowchart of a method 400 of configuring the virtual drill, according to an embodiment. The method 400 includes act 401 of identifying information associated with the medical procedure to be undergone by the patient. The information may include, for example, data associated with entities proposed to be involved in the medical procedure. The one or more entities may include, for example, physicians, nurses, radiologists, medical support staff, etc. The data associated with the one or more entities may include personnel information, photographic data, etc. The information may also include territorial location of the medical procedure. The territorial location may be territorial details associated with a medical facility where the medical procedure is proposed to be conducted on the patient. The information may further include one or more resources to be used in the medical procedure. The one or more resources include medical equipment to be used in the medical procedure such as a medical imaging device, surgical equipment, a patient table, and/or any other equipment that may be identified as a part of the medical procedure. The method 400 further includes act 402 of generating a virtual representation of the one or more entities proposed to be involved in the medical procedure. The virtual representation of the one or more entities may be, for example, a virtual avatar of the one or more entities. The avatar may be a three-dimensional graphical illustration of the one or more entities involved in the medical procedure.

At act 403, a virtual model of the territorial location where the patient may undergo the medical procedure is extracted from the medical database 114. The virtual model of the territorial location may be a three-dimensional representation of the medical facility where the medical procedure is proposed to be conducted. The territorial model may provide details of a structural design of a plurality of rooms in the medical facility where the medical procedure may be conducted. Additionally, the virtual model may also include navigation details associated with the territorial location. In one embodiment, the navigation details enable the patient to understand how he/she may traverse in the medical facility before, during and/or after the medical procedure. In an embodiment, the medical procedure may require the patient to be moved from one room to another for performing a plurality of steps associated with the medical procedure. Therefore, navigation details in the virtual drill enables the patient to be familiarized with the medical procedure. Additionally, the patient may obtain better clarity on the medical procedure and one or more steps associated with the medical procedure.

At act 404, one or more images of the one or more resources to be utilized during the medical procedure are obtained. The one or more images may be two-dimensional. In an embodiment, a three-dimensional representation of the one or more resources may be constructed from the two-dimensional images of the one or more resources. At act 405, one or more procedural workflows associated with the medical procedure are identified. The procedural workflows may include information associated with the one or more steps to be performed during the medical procedure. The procedural workflows enable identification of an order in which a plurality of steps are to be performed in the medical procedure. At act 406, a virtual rendering is generated for the virtual drill. The virtual rendering may be an amalgamation of the one or more information associated with the medical procedure. The virtual rendering may be an accurate step-by-step simulation of the medical procedure to be undergone by the patient. The virtual rendering may provide the patient an understanding of the process that the patient may undergo, for example, from the moment the patient enters the medical facility, in a virtual environment. In an embodiment, the virtual rendering may be a virtual reality based projection that may be visualized by the patient using a head mounted device such as virtual reality goggles. In one embodiment, the configuration of the virtual drill enables generation of an accurate/near accurate virtual environment associated with the medical procedure, for the patient. This gives the patient an understanding of working of the medical procedure.

In an embodiment, real-time position details of the patient that may be captured during the execution of the virtual drill is compared with the target position assumed by the patient before the initiation of the virtual drill. If a deviation is determined between the two positions, the patient may be informed of such deviation in the virtual drill. For example, the virtual rendering may depict the deviation between the two positions to be patient on the head mounted device 106. This enables the patient to move the body/body part to the target position. Alternatively, a virtual representation of the target position to be assumed by the patient may be displayed to the patient on the head mounted device 106. The deviation between the real-time position and the target position is displayed until the patient assumes the target position. For example, the virtual rendering may include one or more visual directional indications that enable the patient to move the body/body part to the target position. In a further embodiment, the deviation from the target position may also be depicted in a different color such that the patient is made aware of the change in the position of the body/body part. In one embodiment, the patient is effectively made aware of any body movements performed by the patient consciously or sub-consciously (e.g., non-periodic and/or periodic movements such as a breathing motion). Therefore, the virtual drill enables the patient to reduce any motion artefact that may be generated during a medical imaging process of the medical procedure.

In a further embodiment, the patient may undertake the virtual drill in a position similar to that of a position in which the patient may assume during the actual medical procedure (e.g., the target position). Therefore, assuming the target position during the virtual drill enables the patient to get accustomed to the position to be assumed during the actual medical procedure. The one or more sensors associated with the head mounted device 106 are configured to determine any angular deviation of the body part associated with the patient that may occur in real-time, in comparison to the target position to be assumed by the patient. For example, a gyroscope associated with the head mounted device 106 may be configured to capture in real-time any angular deviation such as pitch, yaw, and roll associated with the body part of the patient.

Figure 5:
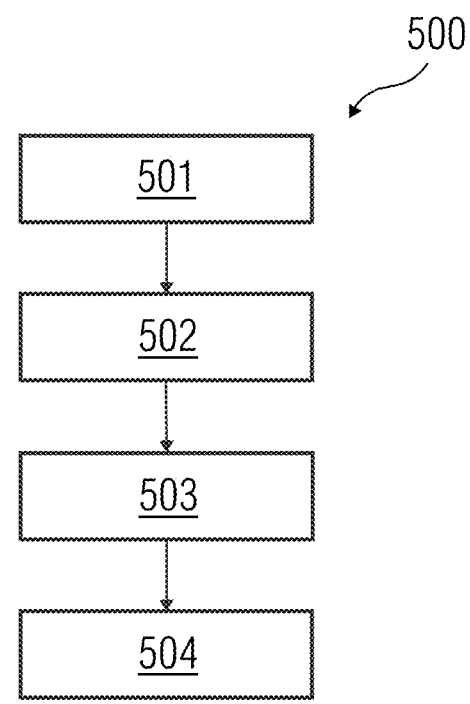
FIG. 5 illustrates a flowchart of a method of predicting a number of repetitions of the virtual drill to be performed by the patient, according to an embodiment.

FIG. 5 illustrates a method 500 of predicting the number of repetitions of the virtual drill to be performed by the patient, according to an embodiment. At act 501, the input data associated with the patient is obtained. The input data may be obtained from the medical database 114. At act 502, one or more historical records associated with the virtual drill are extracted from the database 114. The historical records may be extracted based on the one or more input data associated with the patient. In an embodiment, the historical records associated with the virtual drill may be associated with one or more patients who may have undertaken the virtual drill in the past. In a further embodiment, such one or more patients may have input data similar to the input data of the patient required to undergo the virtual drill. The historical records may include, for example, number of repetitions of the virtual drill undertaken by the one or more patients, for each of the one or more patients. Additionally, the historical records may also include one or more parameters associated with the one or more patients that may have been captured during the execution of the virtual drill. The historical records enable effective prediction of the number of repetitions of the virtual drill to be undertaken by the patient. At act 504, the number of repetitions of the virtual drill to be performed by the patient is predicted by the at least one trained machine learning model based on the one or more historical records associated with the virtual drill. In an embodiment, the machine learning model is based on a regression algorithm. The regression algorithm predicts output values based on input features extracted from input data (e.g., the input data associated with the patient and the one or more historical records associated with the virtual drill). The regression algorithm may be a linear regression algorithm. The model may be represented as:

$$F[X1(n) \ldots Xp(n), Y(n)]$$

where, X1-Xp are the input data associated with the patient, and Y is the number of repetitions of the virtual drill to be undertaken by the patient. The model may be trained using a training dataset $\{(X1(n) \ldots Xp(n), Y(n)), n=\{1 \ldots N\}\}$, where N is the total number of historical records available that may be associated with the virtual drill. Once trained, the machine learning model predicts the number of repetitions (Y) of the virtual drill to be performed for the patient. The method acts describing the training of the machine learning model are detailed in FIG. 8. In one embodiment, the machine learning model enables effective identification of the number of repetitions of the virtual drill to be performed/executed for the patient. Therefore, the emotional response associated with the patient that may arise due to anticipation of the medical procedure may be regulated efficiently.

Figure 6:
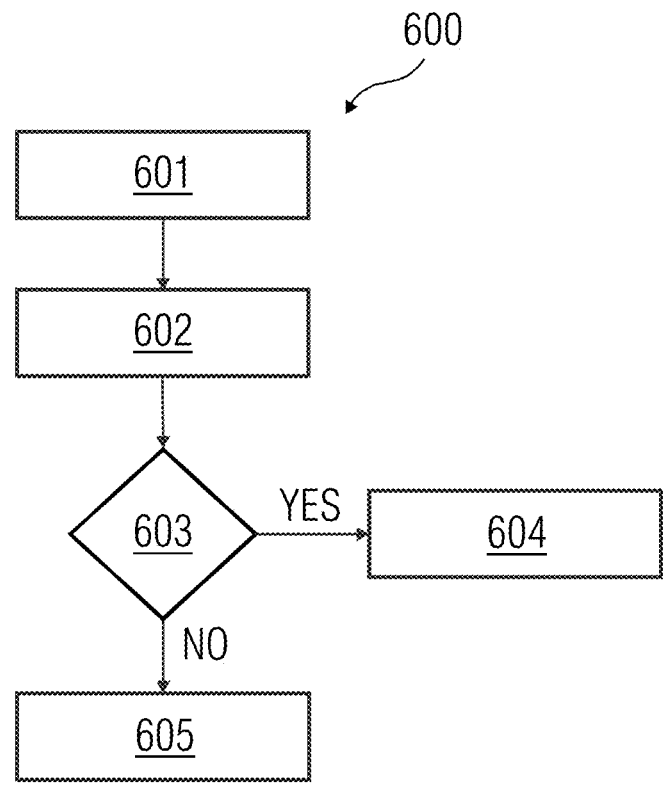
FIG. 6 illustrates a flowchart of a method of modifying the prediction of the number of repetitions of the virtual drill, according to a first embodiment.

FIG. 6 illustrates a method 600 of modifying the prediction of the number of repetitions of the virtual drill, according to a first embodiment. At act 601, a value associated with the one or more parameters is determined. The one or more parameters may be captured using the sensor 104 that may be coupled to the body of the patient. The parameter values may be, for example, blood pressure value associated with the patient, heart rate value associated with the patient, and/or body temperature value associated with the patient. At act 602, a pre-defined threshold associated with the one or more parameters associated with the patient is identified. The pre-defined threshold for the one or more parameters may be a normal range of values within which the one or more parameters may exist for an individual not experiencing any form of negative emotional response. In an embodiment, the pre-defined threshold for the one or more parameters may vary based on the age, gender, and medical history associated with the patient. At act 603, a determination is made if the one or more parameter values are above the pre-defined threshold. If the one or more parameter values associated with the patient are above the pre-defined threshold value, at act 604, the number of repetitions of the virtual drill to be performed by the patient is increased. Increased number of repetitions of the virtual drill may enable the patient to be familiarized with the medical procedure and thereby reduce any anxiety associated with the medical procedure. If the one or more parameter values associated with the patient are within the pre-defined threshold, the number of repetitions of the virtual drill to be executed for the patient is maintained at act 605. Therefore, the number of repetitions of the virtual drill may be maintained as predicted by the machine learning model.

Figure 7:
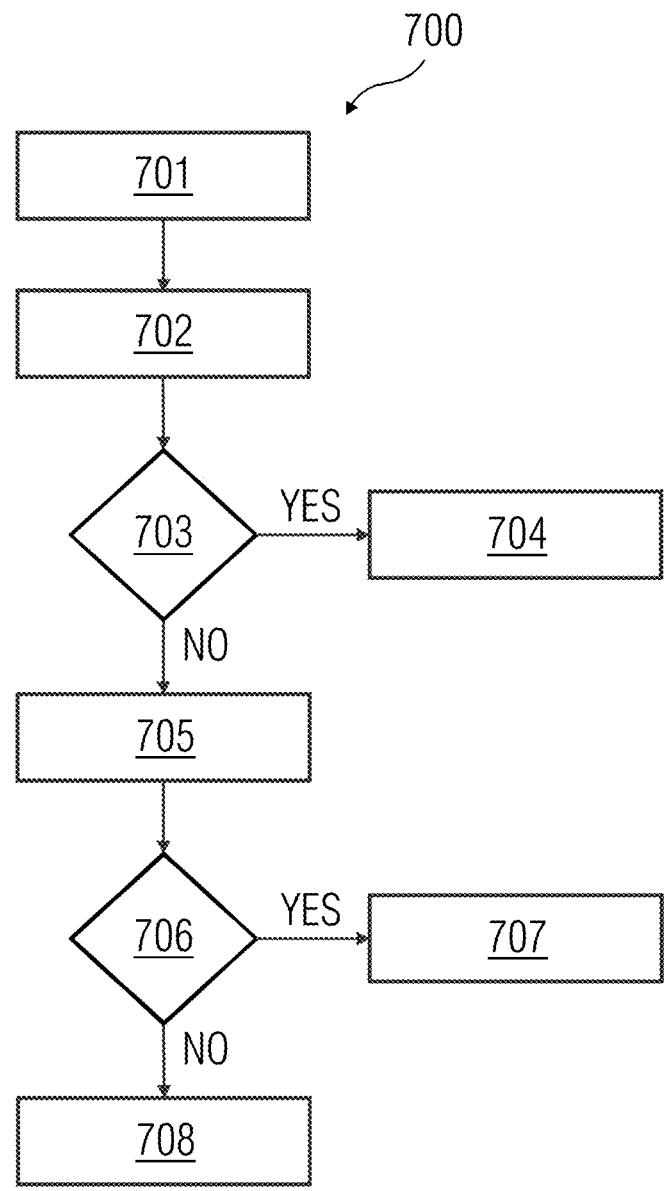
FIG. 7 illustrates a flowchart of a method of modifying the prediction of the number of repetitions of the virtual drill, according to a second embodiment.

FIG. 7 illustrates a method 700 of modifying the prediction of the number of repetitions of the virtual drill, according to a second embodiment. At act 701, a value associated with the one or more parameters is determined. At act 702, a pre-defined threshold value associated with the one or more parameters is identified. At act 703, a determination is made if the one or more parameter values are above the pre-defined threshold. If the one or more parameter values are above the pre-defined threshold, at act 704, the number of repetitions of the virtual drill to be performed by the patient is increased. However, if the one or more parameter values associated with the patient is not above the pre-defined threshold, a notification may be generated for the patient enquiring the patient whether the patient wishes to continue with execution of another instance of the virtual drill. The notification may be displayed on a graphical user interface of the head mounted device 106 worn by the patient for the virtual drill. In an alternate embodiment, the notification may also be generated for one or more stakeholders associated with the medical procedure so as to determine if the virtual drill may be continued to be executed for the patient. In an embodiment, the notification may include one or more options that may be chosen by the patient for performing the next steps associated with the virtual drill. The one or more options may be chosen by choosing one or more radio buttons present in the graphical user interface. At act 706, the response of the patient is analyzed to determine the next steps associated with the virtual drill. If the patient wishes to have another instance of the virtual drill executed, at act 707, at least one instance of the virtual drill is executed for the patient. If the patient chooses to terminate the virtual drill, at act 708, the virtual drill is terminated for the patient. In one embodiment, the execution of the virtual drill may be optimized based on needs of the patient and/or the one or more stakeholders associated with the medical procedure.

Figure 8:
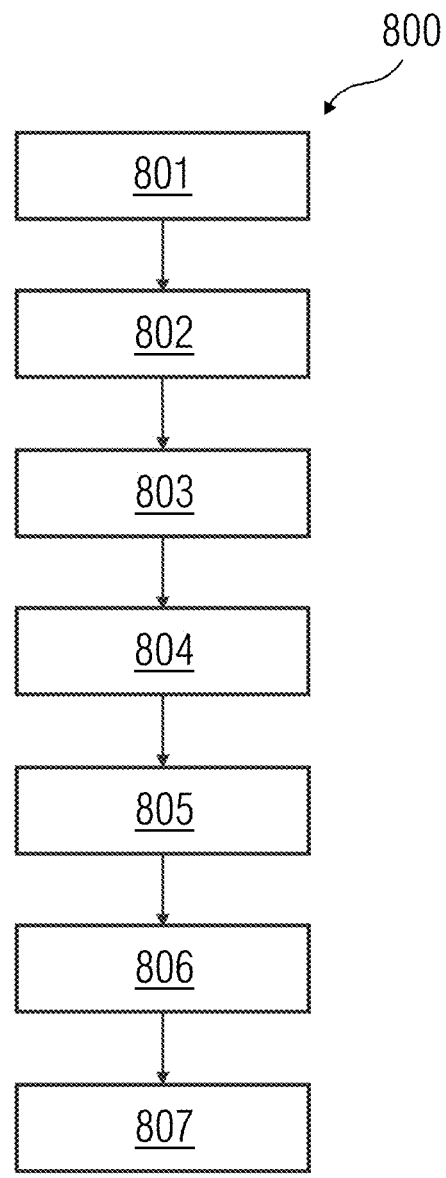
FIG. 8 illustrates a flowchart of a method of training at least one machine learning model to providing a virtual medical procedure drill to the patient, according to an embodiment.

FIG. 8 illustrates a method 800 of training a machine learning algorithm for providing a virtual medical procedure drill. At act 801, reference input data associated with the one or more patients is received. The one or more patients may be chosen such that at least one instance of the virtual drill has been executed for the one or more patients. The reference input data may be received from the medical database 114. The input data associated with the one or more patients includes patient demographic data, medical history associated with the patients, etc. At act 802, input data associated with the patient is obtained. At act 803, at least one machine learning model is received for processing the input data associated with the patient. At act 804, a number of repetitions of the virtual drill to be executed for the patient is determined using the at least one machine learning model. The number of repetitions of the virtual drill is determined based on the reference input data associated with the one or more patients. The reference input data enables determination of an initial number of repetitions to be defined for the virtual drill to be executed for the patient. At act 805, at least one instance of the virtual drill is executed for the patient based on the determined number of repetitions of the virtual drill. During the execution of the at least one instance of the virtual drill, at act 806, one or more parameters associated with the patient are captured using one or more sensors 104. The one or more parameters associated with the patient may be an indication of a negative emotional response that the patient may be experiencing while undergoing the virtual drill. At act 807, the machine learning model is adjusted based on the one or more parameters associated with the patient. For example, if the one or more parameters associated with the patient have a value above a pre-defined threshold, the number of repetitions of the virtual drill may be increased for the patient. Similarly, if the value associated with the one or more captured parameters is below the pre-defined threshold, the number of repetitions of the virtual drill may be maintained or may be decreased for the patient. Therefore, the machine learning model may be further improved to manage the number of repetitions of the virtual drill proposed for the patient. In one embodiment, training of the machine learning model enables effective functioning of the machine learning model. Therefore, regulating emotional responses associated with the patient may be performed with greater accuracy.

Figure 9:
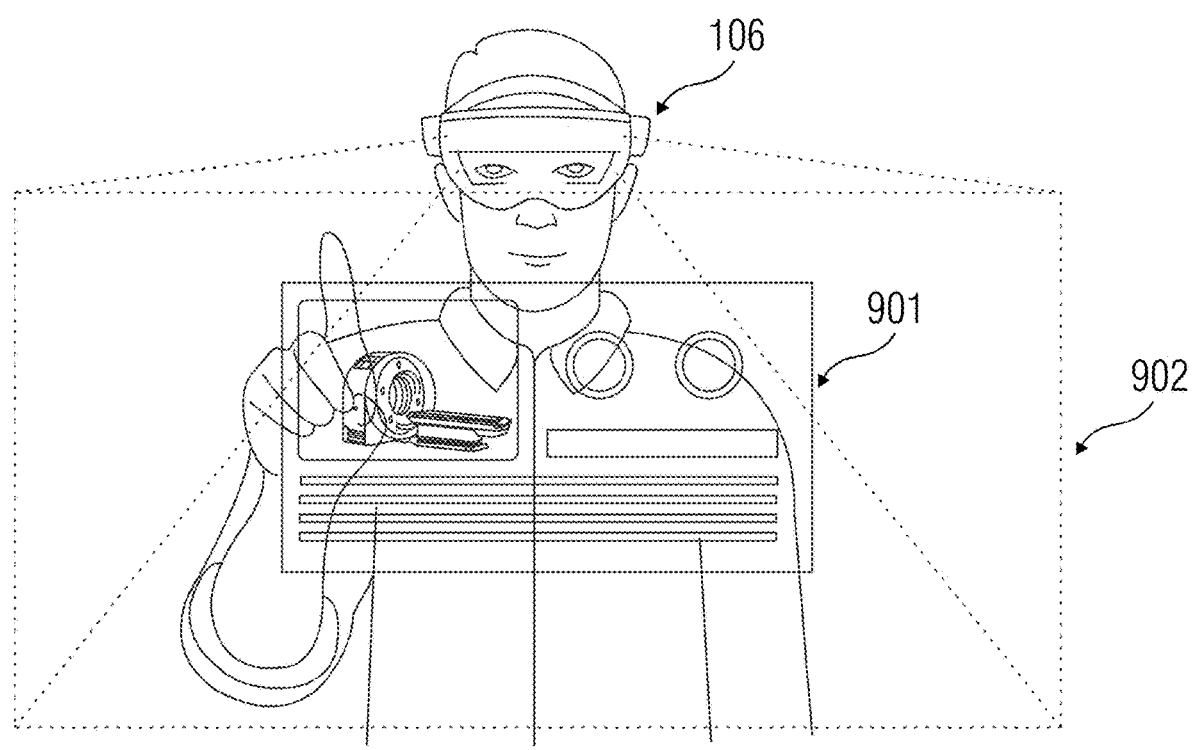
FIG. 9 illustrates an embodiment of a virtual rendering of the virtual drill generated on a display unit of a user device associated with the patient.

FIG. 9 illustrates an embodiment of a virtual rendering of the virtual drill of the virtual drill generated on a display unit of the user device 106 associated with the patient. The virtual rendering 901 may be displayed on a display unit of the user device 106 such that the virtual rendering 901 occupies a major portion of the display area. Such area occupied by the virtual rendering 901 may be increased or decreased on a graphical user interface 902 depending upon a requirement of the patient. Any notification generated for the patient may be displayed in a peripheral area of the display unit of the user device 106 such that the notification appears in the peripheral vision of the entity. The virtual rendering 901 may generate an immersive experience for the patient such that a real-time effect of the medical procedure may be created for the patient.

Figure 10:
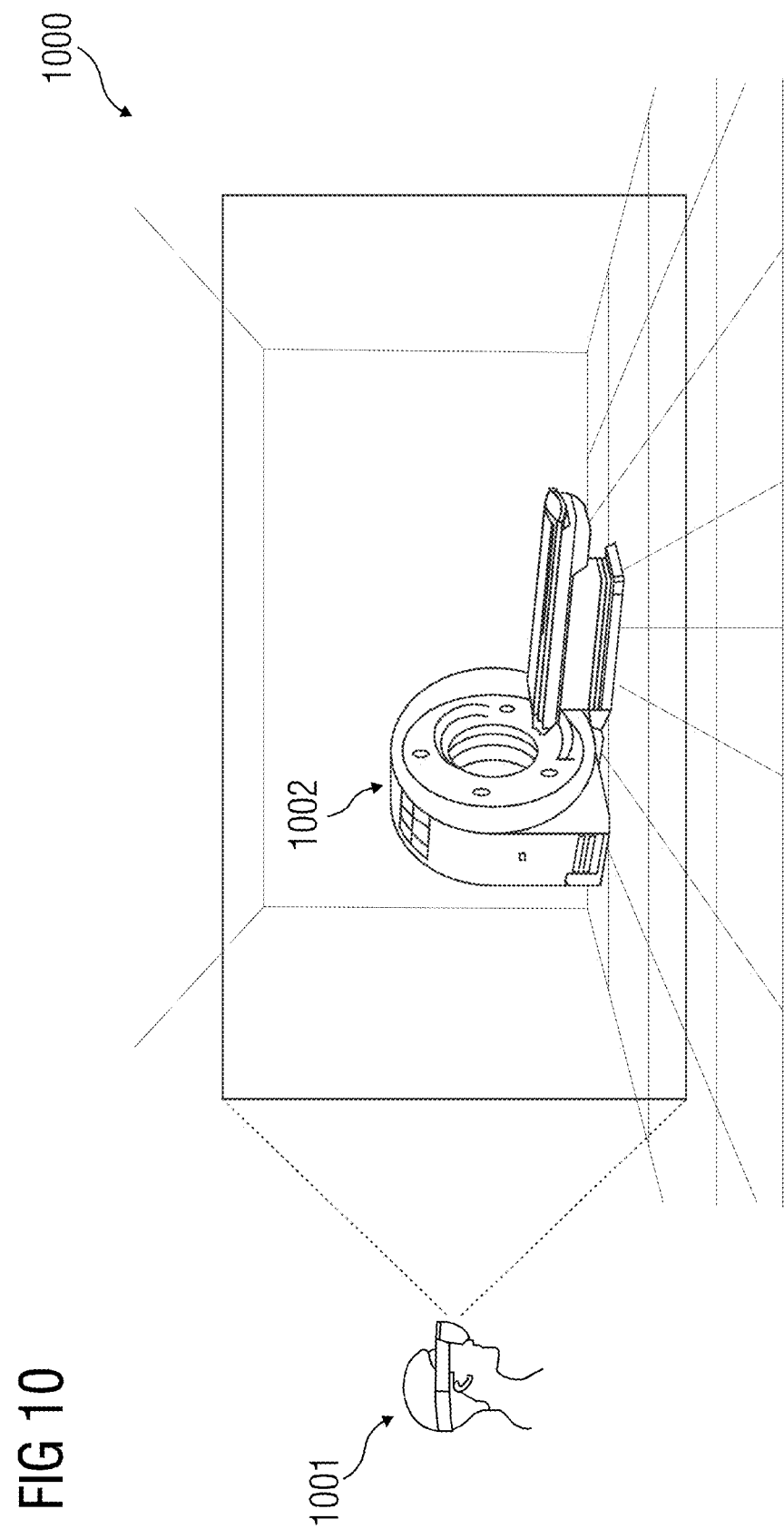
FIG. 10 illustrates an embodiment of a virtual rendering showcasing a representative view of a portion of a territorial location proposed to be a part of the medical procedure.

FIG. 10 illustrates an embodiment of a virtual rendering 1000 showcasing a representative view of a portion of a territorial location proposed to be a part of the medical procedure. The virtual rendering 1000 depicts a virtual model of the territorial location that may be, for example, a medical facility where the medical procedure is scheduled to be performed. The virtual rendering 1000 may be generated in the head mounted device 106 of the patient 1001 and depicts a medical imaging device 1002 placed in a room that may be a part of the medical procedure to be undergone by the patient. In one embodiment, the virtual rendering enables the patient to visualize the medical procedure and get familiarized with the process steps involved in the medical procedure.

The advantage of the present embodiments is that the experience of the patient associated with the medical procedure is improved. Therefore, any negative emotional response that the patient may associated with the medical procedure is effectively regulated. The machine learning model enables effective identification of the number of repetitions of the virtual drill to be performed for the patient based on the input data associated with the patient. Therefore, each workflow of the virtual drill is customized according to needs of the patient.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto, and changes may be made without departing from the scope and spirit of the invention in its aspects.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

What is claimed is:

1. A method of providing a virtual medical procedure drill to a patient, the method comprising computer implemented steps of:
    receiving input data associated with the patient;
    predicting, using a trained machine learning model, a number of repetitions of the virtual medical procedure drill to be undertaken by the patient based on the input data, wherein the virtual medical procedure drill is related to a virtual representation of a medical procedure to be undergone by the patient;
    executing at least one instance of the virtual medical procedure drill for the patient based on the predicted number of repetitions of the virtual medical procedure drill;
    capturing one or more parameters associated with the patient during the execution of the virtual medical procedure drill, wherein the one or more parameters depict an emotional response associated with the patient; and
    modifying the prediction of the number of repetitions of the virtual medical procedure drill to be executed for the patient based on the captured one or more parameters associated with the patient, one or more historical records including information associated with a number of repetitions of the virtual medical procedure drill undergone by other patients, and the number of repetitions of the virtual medical procedure drill executed for the patient,
    wherein modifying the prediction of the number of repetitions of the virtual medical procedure drill comprises:
        determining a value associated with the one or more parameters;
        determining when the value associated with the one or more parameters is above a pre-defined threshold; and
        increasing the number of repetitions of the virtual medical procedure drill to be executed for the patient when the value is above the pre-defined threshold.

2. The method of claim 1, further comprising configuring the virtual medical procedure drill to be executed for the patient.

3. The method of claim 2, wherein configuring the virtual medical procedure drill comprises:
    identifying information associated with the medical procedure to be undergone by the patient, wherein the information comprises information associated with one or more entities proposed to be involved in the medical procedure, a territorial location of the medical procedure, and one or more resources to be used in the medical procedure; and
    generating a virtual rendering of the information for the virtual medical procedure drill.

4. The method of claim 3, wherein configuring the virtual medical procedure drill comprises:
    generating a virtual representation of the one or more entities proposed to be involved in the medical procedure to be undergone by the patient;
    extracting from a database a virtual model of a territorial location where the patient may undergo the medical procedure;
    obtaining one or more images of the one or more resources to be utilized during the medical procedure; and
    identifying one or more procedural workflows associated with the medical procedure to be undergone by the patient.

5. The method of claim 4, wherein the virtual model of the territorial location further comprises one or more navigation details associated with the territorial location.

6. The method of claim 1, further comprising terminating the virtual medical procedure drill to be undertaken by the patient when the prediction of the number of repetitions of the virtual medical procedure drill to be undertaken by the patient is null.

7. The method of claim 1, wherein the input data associated with the patient comprises age of the patient, gender of the patient, medical procedure to be undergone by the patient, one or more instruments associated with the medical procedure to be undergone by the patient, one or more historical medical data associated with the patient, one or more position details associated with the patient, or any combination thereof.

8. The method of claim 7, wherein predicting the number of repetitions of the virtual medical procedure drill to be performed by the patient comprises:
    obtaining the input data associated with the patient;
    extracting one or more historical records associated with the virtual medical procedure drill from a database based on the input data associated with the patient;
    identifying frequency information associated with the virtual medical procedure drill from the one or more historical records; and
    predicting the number of repetitions of the virtual medical procedure drill to be performed by the patient based on the one or more historical records associated with the virtual medical procedure drill.

9. The method of claim 1, further comprising:
    capturing a real-time angular position associated with the patient during the execution of the virtual medical procedure drill;
    determining a deviation between the real-time angular position associated with the patient and a target angular position to be assumed by the patient during the virtual medical procedure drill; and providing a visual biofeedback to the patient during the virtual medical procedure drill when a deviation is identified between the real-time angular position and the target angular position to be assumed by the patient during the virtual medical procedure drill.

10. The method of claim 1, wherein the one or more parameters associated with the patient comprise blood pressure data associated with the patient, heart rate associated with the patient, body temperature associated with the patient, rate of perspiration associated with the patient, or any combination thereof.

11. The method of claim 10, further comprising identifying a negative reaction of the patient to the virtual medical procedure drill while the virtual medical procedure drill is being executed, the identifying of the negative reaction of the patient to the virtual medical procedure drill comprising comparing the captured one or more parameters to a threshold.

12. The method of claim 11, wherein the one or more parameters associated with the patient comprise a body temperature associated with the patient, and wherein the comparing of the captured one or more parameters to the threshold comprises comparing the body temperature associated with the patient to a body temperature threshold, and wherein the identifying of the negative reaction of the patient to the virtual medical procedure drill comprises identifying the negative reaction of the patient to the virtual medical procedure drill when, based on the comparing of the body temperature associated with the patient to the body temperature threshold, the body temperature associated with the patient is greater than the body temperature threshold.

13. The method of claim 1, wherein executing the at least one instance of the virtual medical procedure drill comprises displaying on an output device the virtual rendering of the information associated with the medical procedure to be undergone by the patient.

14. The method of claim 1, wherein modifying the prediction of the number of repetitions of the virtual medical procedure drill comprises:

determining a value associated with the one or more parameters;

determining when the captured one or more parameter values associated with the patient is below a pre-defined threshold; and decreasing the number of repetitions of the virtual medical procedure drill to be executed for the patient when the captured one or more parameter values associated with the patient is below the pre-defined threshold.

15. The method of claim 1, wherein modifying the prediction of the number of repetitions of the virtual medical procedure drill comprises:

determining a value associated with the one or more parameters;

determining when the one or more parameters values is within a pre-defined threshold; and maintaining the number of repetitions of the virtual medical procedure drill to be executed for the patient when the one or more parameter values associated with the patient is within the pre-defined threshold.

16. A method of training at least one machine learning model to regulate an emotional response associated with a patient, the method comprising:

receiving, by a processing unit, reference input data associated with one or more patients, wherein at least one instance of a virtual drill has been executed for the one or more patients;

obtaining, by the processing unit, input data associated with the patient;

receiving, by the processing unit, at least one machine learning model;

determining, by the processing unit, a number of repetitions of the virtual drill to be executed for the patient using the at least one machine learning model, wherein the number of repetitions of the virtual drill is determined based on the reference input data associated with the one or more patients;

executing, by the processing unit, at least one instance of the virtual drill for the patient based on the determined number of repetitions of the virtual drill;

capturing, by the processing unit, one or more parameters associated with the patient during the execution of the at least one instance of the virtual drill; and adjusting, by the processing unit, the machine learning model based on the one or more parameters associated with the patient, one or more historical records including information associated with a number of repetitions of the virtual drill undergone by other patients, and the number of repetitions of the virtual medical procedure drill executed for the patient;

modifying, by the processing unit, the number of repetitions of the virtual drill, the modifying comprising:

determining a value associated with the one or more parameters;

determining when the value associated with the one or more parameters is above a pre-defined threshold; and increasing the number of repetitions of the virtual drill to be executed for the patient when the value is above the pre-defined threshold.

17. A device for regulating an emotional response associated with a patient, the device comprising:

one or more processing units; and a memory coupled to the one or more processing units, the memory comprising a virtual drill module configured to:

receive input data associated with the patient;

predict, using a trained machine learning model, a number of repetitions of a virtual drill to be undertaken by the patient, based on the input data, wherein the virtual drill is related to a virtual representation of a medical procedure to be undergone by the patient;

execute at least one instance of the virtual drill for the patient based on the predicted number of repetitions of the virtual drill;

capture one or more parameters associated with the patient during the execution of the virtual drill, wherein the one or more parameters depict the emotional response associated with the patient; and modify the prediction of the number of repetitions of the virtual drill to be executed for the patient based on the captured one or more parameters associated with the patient, one or more historical records including information associated with a number of repetitions of the virtual drill undergone by other patients, and the number of repetitions of the virtual medical procedure drill executed for the patient, wherein the modification of the prediction of the number of repetitions of the virtual drill comprises:

determination of a value associated with the one or more parameters;
determination of when the value associated with the one or more parameters is above a pre-defined threshold; and
increase of the number of repetitions of the virtual drill to be executed for the patient when the value is above the pre-defined threshold.

18. A system for regulating an emotional response associated with a patient, the system comprising:
one or more servers;
one or more sensors communicatively coupled to the one or more servers, wherein the one or more sensors are configured to capture one or more parameters associated with the patient; and
one or more user devices, communicatively coupled to the one or more servers, wherein the one or more user devices are configured to execute at least one instance of a virtual drill,
wherein the one or more servers comprise computer readable instructions that, when executed by the one or more servers, cause the one or more servers to:
receive input data associated with the patient;
predict, using a trained machine learning model, a number of repetitions of the virtual drill to be undertaken by the patient, based on the input data, wherein the virtual drill is related to a virtual representation of a medical procedure to be undergone by the patient;
execute at least one instance of the virtual drill for the patient based on the predicted number of repetitions of the virtual drill;
capture one or more parameters associated with the patient during the execution of the virtual drill, wherein the one or more parameters depict the emotional response associated with the patient; and
modify the prediction of the number of repetitions of the virtual drill to be executed for the patient based on the captured one or more parameters associated with the patient, one or more historical records including information associated with a number of repetitions of the virtual drill undergone by other patients, and the number of repetitions of the virtual medical procedure drill executed for the patient, and
wherein the modification of the prediction of the number of repetitions of the virtual drill comprises:
determination of a value associated with the one or more parameters;
determination of when the value associated with the one or more parameters is above a pre-defined threshold; and
increase of the number of repetitions of the virtual drill to be executed for the patient when the value is above the pre-defined threshold.

19. A non-transitory computer readable storage medium that stores machine readable instructions executable by a processing unit, the machine readable instructions comprising:
receiving input data associated with a patient;
predicting, using a trained machine learning model, a number of repetitions of a virtual drill to be undertaken by the patient, based on the input data, wherein the virtual drill is related to a virtual representation of a medical procedure to be undergone by the patient;
executing at least one instance of the virtual drill for the patient based on the predicted number of repetitions of the virtual drill;
capturing one or more parameters associated with the patient during the execution of the virtual drill, wherein the one or more parameters depict an emotional response associated with the patient; and
modifying the prediction of the number of repetitions of the virtual drill to be executed for the patient based on the captured one or more parameters associated with the patient, one or more historical records including information associated with a number of repetitions of the virtual drill undergone by other patients, and the number of repetitions of the virtual medical procedure drill executed for the patient,
wherein modifying the prediction of the number of repetitions of the virtual medical procedure drill comprises:
determining a value associated with the one or more parameters;
determining when the value associated with the one or more parameters is above a pre-defined threshold; and
increasing the number of repetitions of the virtual medical procedure drill to be executed for the patient when the value is above the pre-defined threshold.

* * * * *